Figure 1:
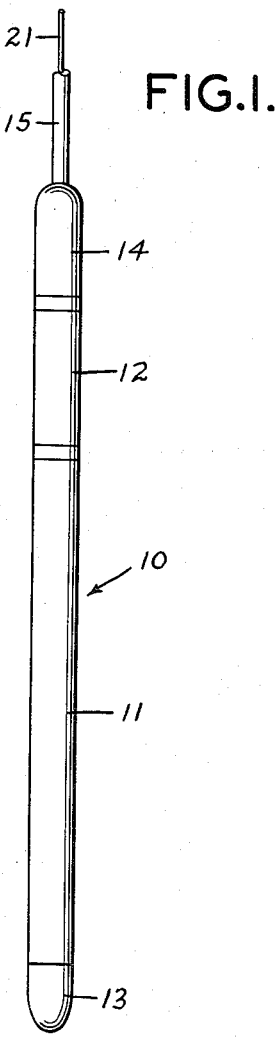

Jan. 24, 1956

J. M. BRICAUD 2,732,518

BORE HOLE DETECTING CIRCUIT AND BORE HOLE FIRING
CIRCUIT UTILIZING A COMMON TRANSMISSION CHANNEL
Filed Nov. 22, 1952

INVENTOR.
JOSEPH M. BRICAUD
BY
Campbell, Brumbaugh, Free & Graves
HIS ATTORNEYS.

United States Patent Office 2,732,518
Patented Jan. 24, 1956

2,732,518
BORE HOLE DETECTING CIRCUIT AND BORE HOLE FIRING CIRCUIT UTILIZING A COMMON TRANSMISSION CHANNEL

Joseph M. Bricaud, Houston, Tex., assignor, by mesne assignments, to Borg-Warner Corporation, Chicago, Ill., a corporation of Illinois Application November 22, 1952, Serial No. 322,070

4 Claims. (Cl. 317—80)

The present invention relates to apparatus for use in bore holes drilled into the earth and more specifically to novel means whereby an electrical detecting circuit in the bore hole may use an electrical transmission channel extending to the surface of the earth, in common with an electrical explosive firing circuit also disposed in the bore hole.

The copending application Serial No. 209,598, filed February 6, 1951, for "Method and Apparatus for Perforating Well Casing or the Like" discloses remarkably effective shaped explosive charge well casing perforating apparatus which is small enough to be lowered into a well through the usual small diameter well tubing communicating with the production equipment at the surface of the earth. In this apparatus, the explosive charges are adapted to be detonated by a suitable fuse set off by an electrically initiated blasting cap in a firing circuit extending to the surface of the earth.

In order to position perforating apparatus of the above character accurately in a well, it is desirable to lower into the bore hole therewith a detecting device such as a magnetic casing collar locator of the type shown in Fagan Patent No. 2,558,427. For high sensitivity and a strong signal output from the casing collar locator a high impedance winding is required. Desirably, a common electrical tranmsission circuit to the earth's surface should be employed for both the perforator apparatus firing circuit and for the detecting circuit of the casing collar locator. However, if the two circuits are connected in series, the presence of the high impedance casing collar locator winding in series in the firing circuit necessitates the use of a very high voltage to develop the current intensity required for detonation of the charges, which voltage may result in cable breakdowns. On the other hand, if the two circuits are connected in parallel, the low resistance firing circuit in parallel with the high impedance casing collar locator winding tends to attenuate the signal generated by the latter.

It is an object of the invention, accordingly, to provide bore hole circuit means of the above general character which is free from the above-noted deficiencies of the prior art.

Another object of the invention is to provide a novel system comprising a bore hole firing circuit and a bore hole detecting circuit connected to a common transmission channel extending to the surface of the earth, in which neither circuit is materially affected by the other.

These and other objects of the invention are attained by connecting the low impedance firing circuit and the high impedance detecting circuit in parallel to a common transmission channel extending to the surface of the earth, and inserting between the firing circuit and the transmission channel electrical means having a low impedance to unidirectional current but a relatively high impedance to reversing current produced by the signals generated in the detecting circuit. In this fashion, the firing circuit does not materially attenuate the signals generated in the detecting circuit. Further, by supplying unidirectional current of proper polarity to the firing circuit through the common transmission channel, the required firing current intensity can be developed with relatively low voltage, because of the low impedance of the firing circuit to unidirectional current.

Figure 2:
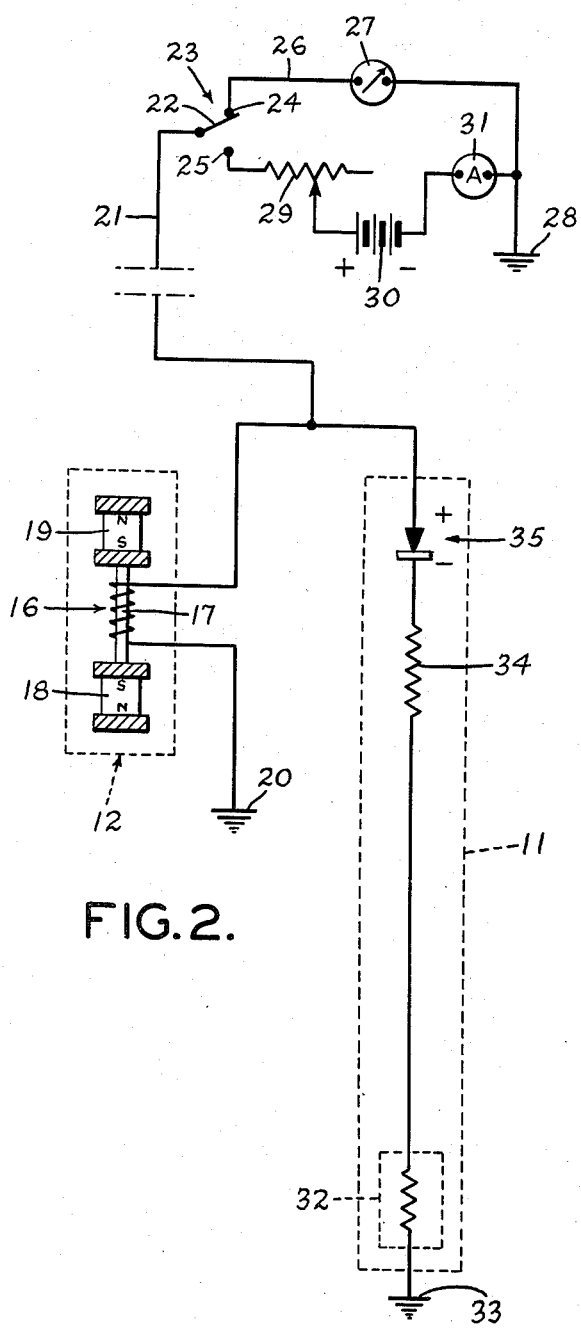

The invention may be better understood from the following detailed description of a representative embodiment thereof taken in conjunction with the accompanying drawings in which:

Fig. 1 illustrates schematically well casing perforating apparatus in conjunction with a bore hole detecting circuit such as a magnetic type casing collar locator, for example; and Fig. 2 is a schematic diagram of a typical electrical circuit for the apparatus of Fig. 1 constructed according to the present invention.

Referring now to Fig. 1, the bore hole apparatus comprises a body 10 including a perforating section 11 which may be constructed in accordance with the disclosure of the above-mentioned Robertson application, a casing collar locating section 12 of the magnetic type such as that shown in the above-noted Fagan patent, a bottom nose 13 and a cable head 14 to which is secured a cable 15 extending to the surface of the earth. Conventional means (not shown) may be provided at the surface for lowering and raising the cable 15 as required to position the body 10 in a bore hole.

The details of the casing collar locating section 12 are fully disclosed in the Fagan patent, to which reference has been made above, and it will not be necessary to describe this portion of the apparatus in detail. Suffice it to say that the apparatus includes a high impedance coil 16 wound on a magnetic member 17 which couples two magnetic structures 18 and 19, as shown in Fig. 2. One end of the coil 16 is grounded at 20 to the body 10 and its other end is connected to a single conductor 21 in the supporting cable 15. The conductor 21 at the surface of the earth is connected to the movable contact arm 22 of a conventional switch 23 which is adapted to engage selectively either of two fixed contacts 24 and 25. The fixed contact 24 is connected by a conductor 26 to a conventional indicating instrument 27 such as a galvanometer, for example, the other terminal of which is grounded at the point 28, the return path to the coil 16 preferably including a metallic braid on the cable 15.

The fixed contact 25 on the switch 23 is connected in series with a conventional rheostat 29, a source of electrical energy 30 which may be a battery, for example, and a conventional current indicating instrument 31, the other terminal of which may also be grounded at the point 28.

The details of the perforating section 11 of the body 10 are likewise well known, being fully set forth in the above-identified Robertson application and it will not be necessary to include a description thereof herein. It will be sufficient to indicate that one terminal of the electrical blasting cap 32 which initiates detonation of the explosive charges is grounded at 33 to the body 10 and its other terminal is connected in series with a current limiting resistance 34 and an electrical element 35 such as a conventional rectifier, for example, to the lower end of the conductor 21 in the supporting cable 15. In accordance with the invention, the positive terminal of the rectifier 35 is connected to the lower end of the cable 21 and the positive terminal of the source of electrical energy 30 is connected through the rheostat 29 to the fixed contact 25 of the switch 23. Under these conditions, when the switch movable contact 22 is moved into engagement with the fixed contact 25, unidirectional current will flow from the source 30 and through the rectifier 35 to the blasting cap 32. However, when the switch movable contact 22 is in engagement with the fixed contact 24 as shown in Fig. 2, and the body 10 is moved through the tubing in the well, an alternating voltage will be induced in the winding 16 each time a casing collar is passed. Because of the presence of the rectifier 35, the firing circuit including the blasting cap 32 has a relatively high impedance to alternating current as compared with the impedance of the circuit including the cable conductor 21 and the indicator 27 at the surface of the earth. As a result, the firing circuit will not tend to attenuate the signals developed by the casing collar locating winding 16.

In operation, the switch movable contact 22 is first moved into engagement with the fixed contact 24 and the body 10 is lowered through the well tubing. As stated, each time the body 10 passes a casing collar or any other anomaly in the casing, an alternating voltage is induced in the winding 16 which is transmitted through the cable conductor 21 to the indicating instrument 27 at the surface of the earth. When the body 10 has reached the level of a casing collar or other identifying marker near the level in the well where a perforating operation is to be performed, it is moved a measured distance to the perforating location where it is brought to rest. The movable switch contact 22 is then moved into engagement with the contact 25. This supplies unidirectional current to the upper end of the cable conductor 21. Because of the high impedance of the casing collar locator winding 16 and the relatively low impedance of the firing circuit including the blasting cap 32, the major portion of the current flows in the firing circuit. By adjustment of the rheostat 29, the intensity of this current can be brought to the proper value to set off the blasting cap 32 and initiate detonation of the explosive charges in the perforating of the portion 11 in the body 10.

In a typical circuit constructed according to the invention, the casing collar locating winding 16 might have a resistance of about 500 ohms; the resistor a resistance of about 50 ohms; and the blasting cap 32 a resistance of about 2 or 3 ohms.

From the foregoing, it will be apparent that the invention provides novel means whereby a bore hole firing circuit and a bore hole detecting circuit may utilize a common transmission channel extending to the surface of the earth without either circuit having any material effect on the other. By inserting between the firing circuit and the common transmitting channel an electrical element having a relatively high impedance to A. C. but a low resistance to unidirectional current, the firing circuit does not tend to attenuate seriously the signals developed in the detecting circuit yet it has a sufficiently low impedance to unidirectional current to enable the requisite current intensity for setting off the firing means in the firing circuit to be attained without using excessively high voltages. In addition, the inclusion of a current limiting resistor in the firing circuit prevents possible initiation of the latter by spurious signals of the proper polarity that may be present.

The single embodiment described herein is intended to be merely illustrative and is obviously susceptible of modification within the spirit of the invention. For example, any other suitable electrical elements such as, for example, an electrolytic condenser may be used in place of the rectifier 35 in Fig. 2. Other modifications will be apparent to those skilled in the art. The invention, therefore, is not to be regarded as limited to the single embodiment described and illustrated herein but its scope is defined in the appended claims.

I claim:

1. In bore hole apparatus, the combination of relatively high impedance magnetic induction conductor means adapted to be lowered into a bore hole for producing a signal indicative of a condition within the bore hole, a relatively low impedance electrical utilization circuit mounted in fixed relation to said magnetic induction conductor means and electrically connected in parallel therewith, an electrical element connected in said utilization circuit having a relatively high impedance to reversing current and a relatively low impedance to unidirectional current, an electrical circuit common to said parallel connected utilization circuit and magnetic induction conductor means and including a single electrical conductor extending to the surface of the earth, a source of unidirectional electrical current, electrical indicating means responsive to said signal, and electrical means for selectively connecting said source and said indicating means in said common electrical circuit.

2. In bore hole apparatus, the combination of relatively high impedance magnetic induction conductor means adapted to be lowered into a bore hole, a relatively low impedance utilization circuit mounted in fixed relation to said magnetic induction conductor means and electrically connected in parallel therewith, unidirectionally conductive electrical means in said utilization circuit, a single electrical conductor connected to one side of said parallel connected magnetic induction conductor means and utilization circuit and extending to the surface of the earth, electrical indicating means, a source of unidirectional electrical energy, circuit means connecting one terminal of said source and one terminal of said indicating means to the other side of said parallel connected magnetic induction conductor means and utilization circuit, and electrical switching means for connecting the upper end of said single conductor selectively to the other terminal of said source and to the other terminal of said indicating means.

3. In apparatus for perforating well casing and the like, the combination of a housing adapted to be lowered into a well, casing collar locator means having a magnetic induction winding in said housing, casing perforating apparatus having an electrical firing circuit in said housing connected in parallel with said magnetic induction winding, an electrical element connected in said firing circuit having a relatively low impedance to unidirectional current and a relatively high impedance to reversing current, a source of unidirectional current at the surface of the earth, electrical indicating means at the surface of the earth, and electrical circuit means including switching means for connecting said source and said indicating means selectively to said parallel connected magnetic induction winding and firing circuit.

4. In apparatus for perforating well casing and the like, the combination of a housing adapted to be lowered into a well, casing collar locating means having a relatively high impedance magnetic induction winding in said housing, casing perforating apparatus having a relatively low impedance firing circuit in said housing connected in parallel with said housing, unidirectionally conducting means in said firing circuit, a source of unidirectional current at the surface of the earth, electrical switching means having a movable contact connected to one side of said parallel connected magnetic induction winding and firing circuit and adapted to engage selectively two fixed contacts connected, respectively, to one terminal of said indicating means and to one terminal of said source, and electric circuit means connecting the other terminals of said source and of said indicating means to the other side of said parallel connected magnetic induction winding and firing circuit.

References Cited in the file of this patent

UNITED STATES PATENTS

| 503,321 | Hunter | Aug. 15, 1893 |
| 695,529 | Bedell | Mar. 18, 1902 |
| 2,338,872 | Robidaux | Jan. 11, 1944 |
| 2,558,427 | Fagan | June 26, 1951 |
| 2,597,075 | Derr | May 20, 1952 |
| 2,602,833 | Swift | July 8, 1952 |